United States Patent [19]
Cutler

[11] 3,876,226
[45] Apr. 8, 1975

[54] ATTACHMENT OF TRANSVERSE ARMS TO VEHICLES

[75] Inventor: Frederick Cutler, Bidford-on-Avon, England

[73] Assignee: Bomfard & Evershed Limited, Worcestershire, England

[22] Filed: Dec. 11, 1972

[21] Appl. No.: 313,634

[30] Foreign Application Priority Data
Jan. 27, 1972 United Kingdom............... 3884/72

[52] U.S. Cl.......... 280/124 R; 180/14 R; 280/150 C
[51] Int. Cl.............................................. B60p 3/28
[58] Field of Search... 180/14 R; 280/150 R, 150 C, 280/6 R, 6 H, 6.1; 56/10.2, .4, 15.7

[56] References Cited
UNITED STATES PATENTS

| | | | |
|---|---|---|---|
| 2,473,903 | 6/1949 | Purifoy | 280/6.1 |
| 2,841,404 | 7/1958 | Eitel | 280/6 |
| 3,652,101 | 3/1972 | Pivonka | 280/6.1 |
| 3,731,470 | 5/1973 | Cornish et al. | 280/6 |

*Primary Examiner*—Robert J. Spar
*Assistant Examiner*—Ross Weaver
*Attorney, Agent, or Firm*—Watson, Cole, Grindle & Watson

[57] ABSTRACT

The specification discloses a sub-assembly for attaching a laterally extending arm (e.g., for a mower) to a vehicle of the type having at least one axle carrying road wheels, the axle being sprung relative to the vehicle chassis and/or body, in which there are provided means to mount the sub-assembly on the chassis and/or body to transfer at least part of the vertical loads (e.g., the weight of the arm) indirectly to the axle by the springs, and means for transferring the overturning moment produced by the arm directly to the axle.

8 Claims, 5 Drawing Figures

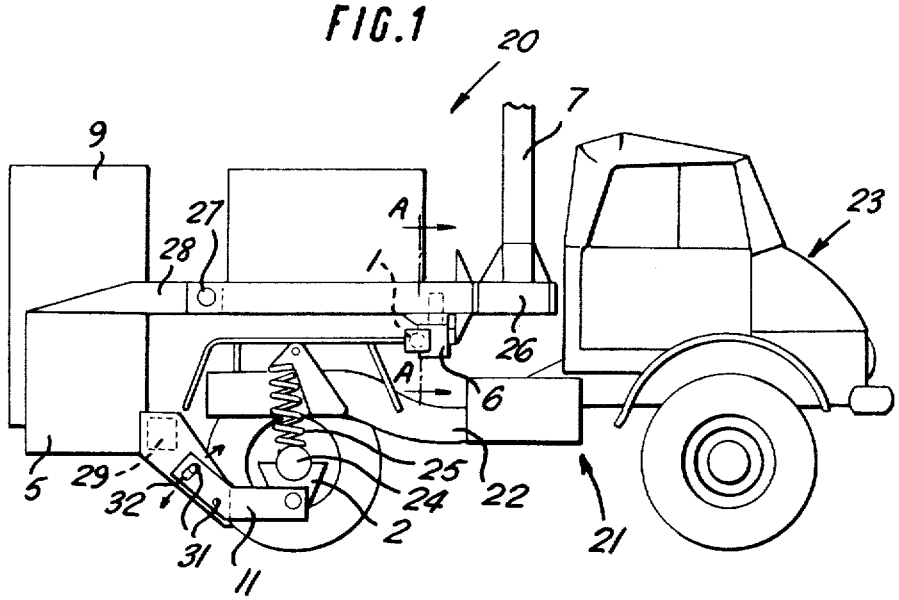
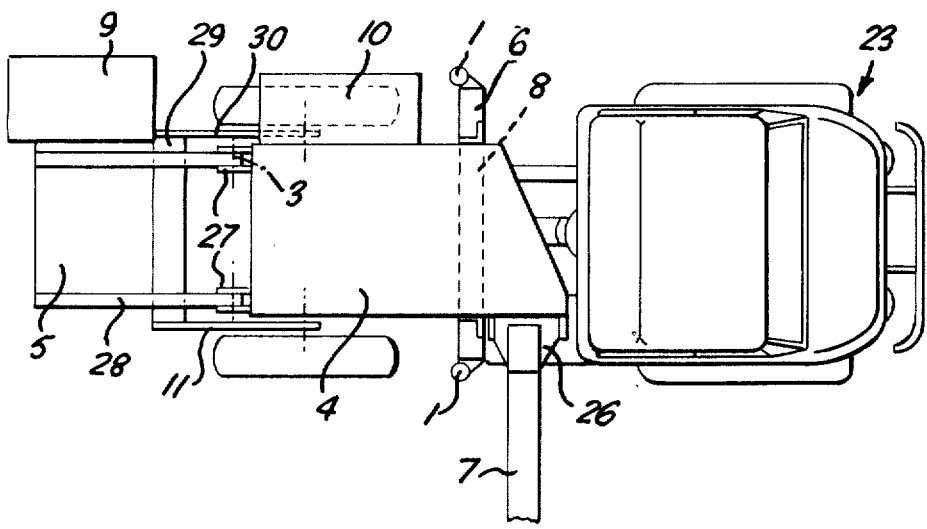

ATTACHMENT OF TRANSVERSE ARMS TO VEHICLES

BACKGROUND OF THE INVENTION

The invention relates to apparatus for the attachment of an arm to a vehicle so that the arm extends laterally and particularly to vehicles having at least one sprung axle for road wheels.

In conventional apparatus the arm is mounted directly on the vehicle chassis. The effect is that the vehicle springs on the same side as the arm are compressed whereas the springs on the opposite side are extended. In order to increase the stability of such vehicles, either the suspension units on the same side as the arm have been blocked, or a counter-weight has been mounted laterally inwards or outwards so that it can be moved in accordance with the position of the arm.

The object of the invention is to provide an improved mounting means for a lateral arm on a vehicle which automatically maintains the vehicle relatively level, despite the widely varying overturning moments applied thereto due to the different working positions of the arm and the intermittent support given thereto by the ground.

In particular, it is an object of the invention to obviate the need for constantly adjusting the position of a counter-weight as in some conventional arrangements.

It is a further object of the invention to provide a mounting means for a lateral arm that does not involve interfering with the operation of the vehicle suspension system (such as by blocking) whereby working speeds over rough terrain can be increased without consequent damage to the vehicle which could occur if the suspension system is locked.

The invention provides a sub-assembly for attaching a laterally extending arm (e.g., for a mower) to a vehicle of the type having at least one axle carrying road wheels, the axle being sprung relative to the vehicle chassis and/or body, in which there are provided means to mount the sub-assembly on the chassis and/or body to transfer at least part of the vertical loads (e.g., the weight of the arm) indirectly to the axle by the springs, and means for transferring the overturning moment produced by the arm directly to the axle.

The sub-assembly may comprise a structure torsionally rigid about the longitudinal axis of the vehicle, the structure having means to attach the arm to the structure, there being means to mount the structure on the chassis and/or body capable of transferring vertical loads but not overturning moments to the chassis and/or body, and links connecting the structure to the axle the links being capable of transferring overturning moments from the structure to the axle.

In the last described arrangement the mounting means may comprise two laterally spaced apart supports connected directly to the chassis and/or body.

The structure may comprise a generally planar platform and may be carried on the supports such that the general plane of the platform is oblique to a line joining the supports.

Two sets of links may be provided, one set connecting each side respectively of the structure to the respective end portion of the axle. At least one of the sets of links may be adjustable such that the structure may be set up with a lateral bias with respect to the axle.

The invention also provides a sub-assembly as described above in combination with an arm mounted on the sub-assembly and extending laterally of the sub-assembly.

The invention further provides a vehicle having at least one axle carrying road wheels, the axle being sprung relative to the vehicle chassis and/or body and a sub-assembly as described above mounted on the chassis and/or body and connected to the axle.

BRIEF DESCRIPTION OF THE DRAWINGS

FIG. 1 is a side view of a first embodiment of sub-assembly shown mounted on a vehicle;

FIG. 2 is a plan view of the first embodiment;

Figure 3:
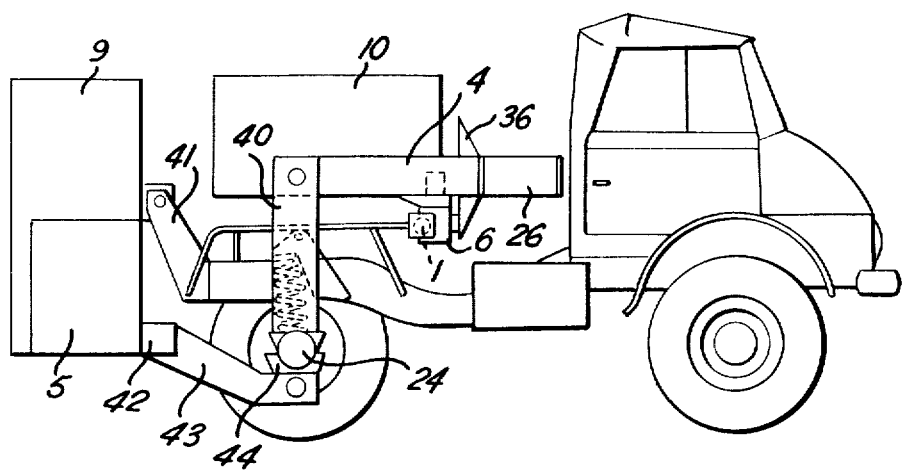
FIG. 3 is a side view of a second embodiment of sub-assembly shown mounted on a vehicle.

In the drawings, the sub-assembly 20 is shown mounted on a vehicle 21 having two beam axles on which the road wheels are rotatably mounted. The beam axles are sprung relative to the vehicle chassis 22 and body 23, and the rearmost axle 24 supports the chassis by means of coil springs 25. The chassis is provided with at least one transverse beam (not shown) extending across the vehicle. Upward projections are provided at opposite ends of the beam which projections carry at their upper ends the laterally spaced ball supports 1 which are not shown in the drawings and to which a carried load may be attached.

Referring to FIGS. 1 and 2, the first embodiment of sub-assembly is shown, and comprises a structure 4 in the form of a platform or table which is torsionally rigid about the longitudinal axis of the vehicle. The structure 4 is provided with a mounting clevis 26 at the right-hand end (in the Figures) to which a laterally extending arm 7 is pivotally attached. The arm may comprise two or more relatively movable parts (not shown), and an attachment such as a mower, scrub chopper or grip cleaner may be attached to the outer end of the arm.

A beam 6 is mounted on the ball supports 1 in a manner described below, and the structure 4 to the rear of the clevis 26 rests on the beam 6 which supports the forward end of the structure 4. The only reason that the ball supports 1 are used to carry the beam is that they are standard equipment on the type of vehicle described, the basic requirement being that in use the beam 6 is rigidly attached to the chassis. A ballast load 10 is attached to the side of the structure 4 opposed to that from which the arm 7 extends and to the rear of the beam 6.

The rearmost edge of the structure 4 has two pairs of lugs 27 attached thereto, one pair on each side, there being links 28 mounted on the lugs 27 by means of pivot pins 3. The links 28 support a gearbox and hydraulic fluid pump assembly 5, driven from the engine of the vehicle, and a tank 9 for hydraulic fluid. A transverse box-member 29 is attached to the front lower edge of the gearbox and pump assembly 5, and downwardly and forwardly extending links 11 and 30 are rigidly attached to the ends of the box-member 29. The lower ends of the links 11 and 30 are pivotally attached to clamps 2, arranged one each side of the rear axle 24. The link 11 is in two parts clamped together by bolts 31, and is adjustable as shown by the arrow 32.

Figure 4:
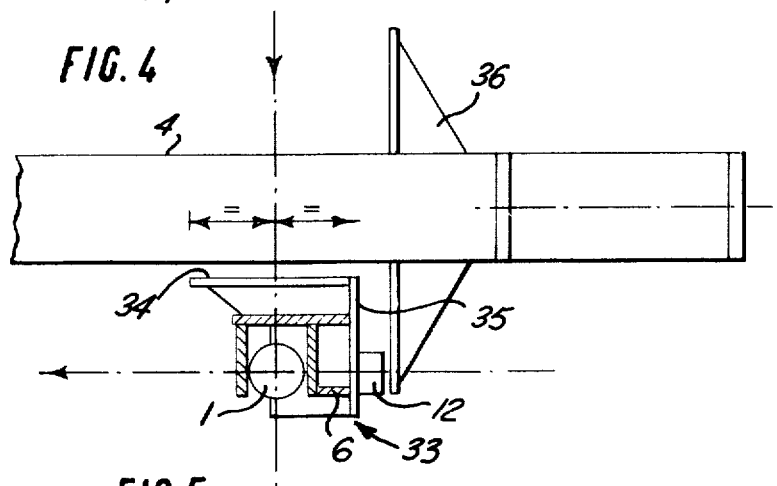
FIGS. 4 and 5 are detail views of part of the embodiments shown in FIGS. 1 and 3.
Figure 5:
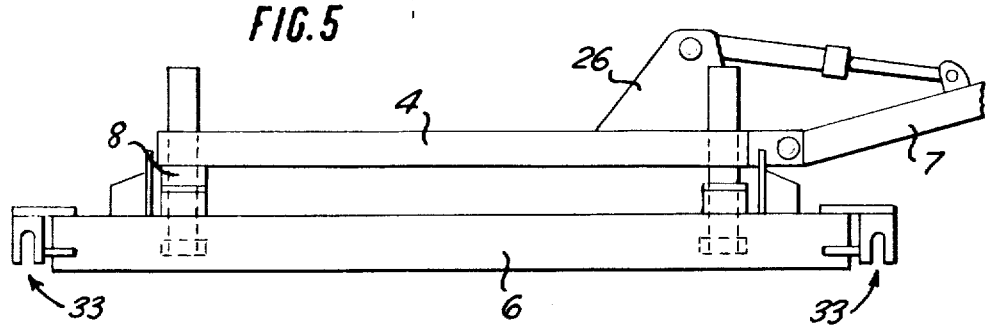

FIGS. 4 and 5 show, in greater detail, the beam 6 and the ball supports 1. The beam 6 rests on the ball supports 1 and has two housings 33 in which the ball supports are located. The beam has a top face 34 and a thrust block 12 on the front face 35. The top face 34 and block 12 are disposed so that planes passing through the centre of the ball divided the areas of the top face and block equally, as shown in FIG. 4. The structure 4 rests on the beam 6 and has brackets 36 forward of the beam and which engage the blocks 12 to maintain structure 4 in the position shown in FIG. 1. In the side of the structure opposed to the arm 7 a spacer 8 may be interposed between the resepctive top face 34 and underside of the structure as shown in the drawings, whereas on the other side of the structure, the underside bears directly on the top face.

In use, an overturning moment is produced by the weight of the arm 7 and the attachment (not shown). This moment is transferred to the rear axle by the structure 4, links 28, gearbox and pump assembly 5 and links 11 and 30, which together form a torsionally rigid assembly. However, this moment still produces a tendency for the vehicle to lean in the direction of the applied forces due to the difference in the load on the two rear tyres. The rear tyre nearest to the arm 7 will squab down, whilst the opposite tyre will assume virtually circular shape. Accordingly, a further compensation for this effect is met by the spacer 8. This has the effect of biassing the vehicle suspension by applying a downward vertical force to the opposite side of the chassis, and its effect is further assisted by the weight of the hydraulic fluid tank 9 and the ballast load 10.

It will be appreciated that the structure 4, resting on the beam 6, is unable to transfer an overturning moment from the arm 7 to the chassis. Such a moment will result in the structure 4 pivoting about one of the support faces 34.

Since the overturning moment is applied consistently throughout the system in the same direction irrespective of the position of the lateral arm (but, of course, varying in magnitude in relation to the position of the arm), it is necessary to provide biassing means whereby the sub-assembly can be adjustably tilted in the opposite direction to compensate for the tilt induced by virtue of the clearance in the various pivots and connections, being taken up the same way throughout the system. This is achieved by adjusting the link 11.

The weight of the arm 7 and its attachment, and of part of the ballast load 10 are transferred to the chassis through the beam 6 to the ball supports 1. The ballast load is provided so that the weight of the arm 7 and attachment results in a reduced turning moment about the axle 24.

In operation, the weight of gearbox and pump assembly 5 and tank 9, acting about the pivot at the rear axle 24, maintains a tension at pivot pin 3 and hence a tension in the structure 4 which is transmitted horizontally to the beam 6 by the thrust blocks 12 (FIG. 4), on the centre line of the mounting ball. Slight rotation of the structure 4 about a vertical axis due to axle articulation is absorbed by the ability of either of the brackets 35 to move away from the respective thrust block 12, and similarly any rotation of the structure 4 about a horizontal longitudinal axis is provided for in that the structure may lift clear of the spacer 8 or top face 34.

FIG. 3 shows a second embodiment of the sub-assembly which is similar in characteristics to that just described and like parts are given like reference numerals.

This embodiment differs from that already described in that the structure 4 is connected directly to the rear axle 24 by means of links 40. The gearbox and pump assembly 5 and tank 9 are mounted separately from the sub-assembly, to brackets 41 attached to the vehicle chassis and to a box member 42 and links 43 which are pivotally attached to clamps 44 on the rear axle. In this embodiment, one or both of the links 40 may be adjustable for length and/or angle.

It will be appreciated that the normal function of the vehicle suspension system to permit relative movement between the axles and the chassis is unimpaired by the fitment or operation of the sub-assembly.

I claim:

1. A sub-assembly for attaching a laterally extending arm, for example, an arm for carrying a mower, to a vehicle having a chassis, at least one axle carrying road wheels, and springs secured in place between said axle and said chassis for supporting said chassis, support members on said chassis forwardly on the axle, the sub-assembly resting on said support members and being movable relative to said chassis and to said support members, whereby at least part of the vertical loads, for example, the weight of the arm, is transferred indirectly to said axle by said springs, the sub-assembly extending rearwardly of said axle and having rigid link members thereon extending in a forward direction below said axle, said link members being directly connected to said axle, whereby an overturning moment produced by the arm is transferred directly by said link members to said axle independent of said springs to thereby avoid any overturning of the vehicle, said link members also serving to maintain a constant angular relationship between the sub-assembly and said axle.

2. A sub-assembly is claimed in claim 1 which comprises a structure torsionally rigid about the longitudinal axis of the vehicle, the structure having means to attach the arm to the structure, means comprising said support members mounting the structure on the chassis capable of transferring vertical loads but not overturning moments to the chassis, said rigid link members connecting the structure to the axle, the link members being capable of transferring overturning moments from the structure to the axle.

3. A sub-assembly as claimed in claim 2 wherein said support members comprise two laterally spaced apart supports connected directly to the chassis.

4. A sub-assembly as claimed in claim 3 wherein the structure comprises a generally planar platform and is carried on the supports with the general plane of the platform oblique to a line joining the supports.

5. A sub-assembly as claimed in claim 2 wherein two sets of said link members are provided, one set connecting each side respectively of the structure to the respective end portion of the axle.

6. A sub-assembly as claimed in claim 5 wherein at least one of the sets of said link members is adjustable whereby the structure may be set up with a lateral bias with respect to the axle.

7. A sub-assembly as claimed in claim 1 in combination with an arm mounted on the sub-assembly and extending laterally of the sub-assembly.

8. A vehicle having at least one axle carrying road wheels, the axle being sprung relative to the vehicle chassis and a sub-assembly as claimed in claim 1 mounted on the chassis and connected to the axle.

* * * * *